United States Patent
De Bougrenet De La Tocnaye et al.

(10) Patent No.: US 11,947,118 B2
(45) Date of Patent: Apr. 2, 2024

(54) CONTACT LENS FOR AUGMENTED REALITY AND METHOD THEREOF

(71) Applicant: INSTITUT MINES TELECOM, Palaiseau (FR)

(72) Inventors: Jean-Louis De Bougrenet De La Tocnaye, Guilers (FR); Vincent Nourrit, Brest (FR); Kevin Heggarty, Lanrivoare (FR)

(73) Assignee: INSTITUT MINES TELECOM, Palaiseau (FR)

( * ) Notice: Subject to any disclaimer, the term of this patent is extended or adjusted under 35 U.S.C. 154(b) by 0 days.

(21) Appl. No.: 17/758,284

(22) PCT Filed: Jan. 21, 2021

(86) PCT No.: PCT/EP2021/051357
§ 371 (c)(1),
(2) Date: Jun. 30, 2022

(87) PCT Pub. No.: WO2021/148548
PCT Pub. Date: Jul. 29, 2021

(65) Prior Publication Data
US 2023/0023682 A1 Jan. 26, 2023

(30) Foreign Application Priority Data
Jan. 21, 2020 (FR) .................................. 2000575

(51) Int. Cl.
*G02B 27/01* (2006.01)
*G02B 27/42* (2006.01)
(Continued)

(52) U.S. Cl.
CPC ..... *G02B 27/0172* (2013.01); *G02B 27/4205* (2013.01); *G02C 7/04* (2013.01);
(Continued)

(58) Field of Classification Search
CPC ............ G02B 27/0172; G02B 27/4205; G02B 2027/0174; G02C 7/04; G02C 2202/20; G06T 19/006
See application file for complete search history.

(56) References Cited

U.S. PATENT DOCUMENTS 9,798,147 B1  10/2017  Park et al.
9,810,910 B1  11/2017  Park et al.
(Continued)

FOREIGN PATENT DOCUMENTS

| | | |
|---|---|---|
| EP | 2778766 A1 | 9/2014 |
| JP | 2005311823 A | 11/2005 |
| WO | 2019231306 A2 | 12/2019 |

OTHER PUBLICATIONS

Machine translation of JP 2005-311823 (Year: 2023).*

*Primary Examiner* — Michael Pervan
(74) *Attorney, Agent, or Firm* — BROWDY AND NEIMARK, P.L.L.C.

(57) ABSTRACT

The contact lens (100) for augmented reality comprises: a transparent body (102) designed to be placed on an eye (104); and at least one augmented reality module comprising an optical source (114) attached to the transparent body (102) and designed to emit a light into the transparent body, and an optical element (116) attached to the transparent body (102) and designed to receive the light from the optical source (114) and send it in the direction of the eye (104).

The optical element (116) is a hologram designed to diffract the received light as a holographic image in the direction of the eye (104).

10 Claims, 3 Drawing Sheets

(51) Int. Cl.
*G02C 7/04* (2006.01)
*G06T 19/00* (2011.01)

(52) U.S. Cl.
CPC .... *G06T 19/006* (2013.01); *G02B 2027/0174* (2013.01); *G02C 2202/20* (2013.01)

(56) References Cited

U.S. PATENT DOCUMENTS

| | | | |
|---|---|---|---|
| 11,480,792 B2 * | 10/2022 | Lee | G02B 27/4205 |
| 11,509,883 B2 * | 11/2022 | Shin | H04N 13/366 |
| 2014/0268035 A1 * | 9/2014 | Pugh | G02C 7/04 |
| | | | 351/159.73 |
| 2020/0004023 A1 | 1/2020 | Shin et al. | |
| 2020/0004025 A1 * | 1/2020 | Lee | G02B 27/4205 |
| 2020/0257124 A1 * | 8/2020 | Shin | G02B 6/005 |
| 2021/0337181 A1 * | 10/2021 | Shin | H04N 13/239 |

* cited by examiner

[Fig. 1]
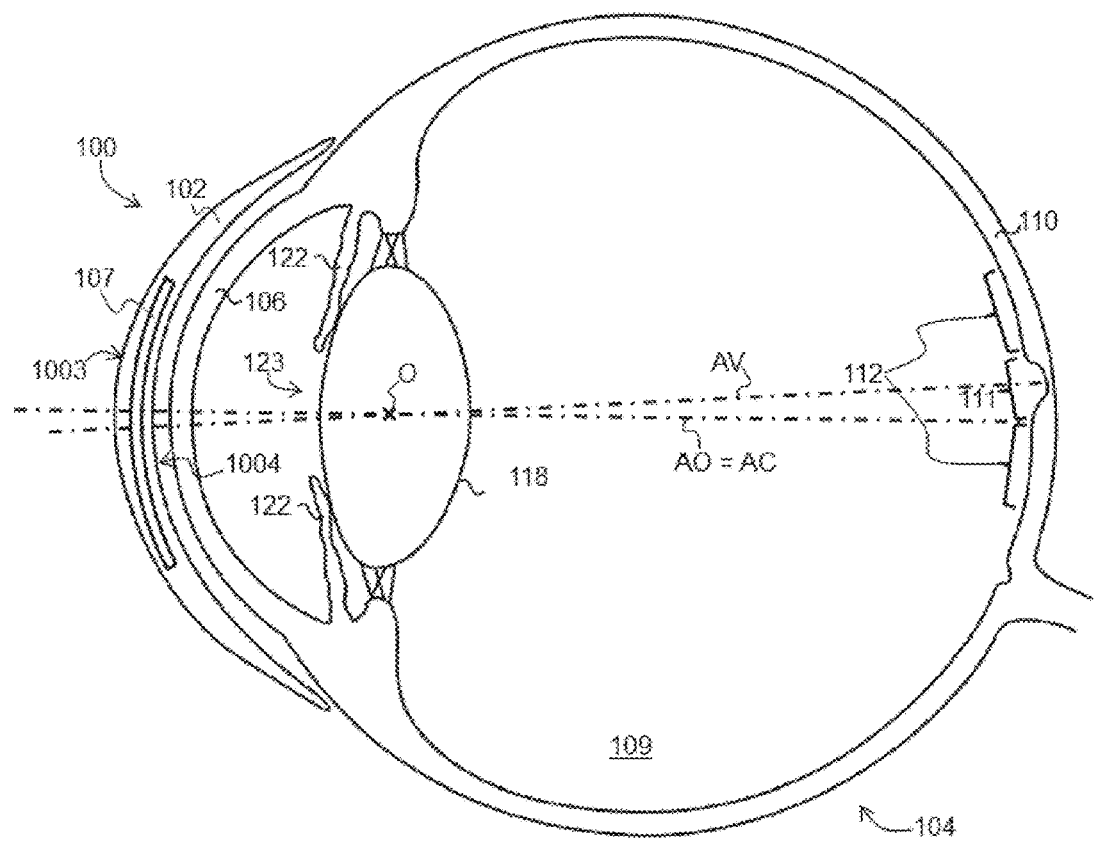
[Fig. 2]
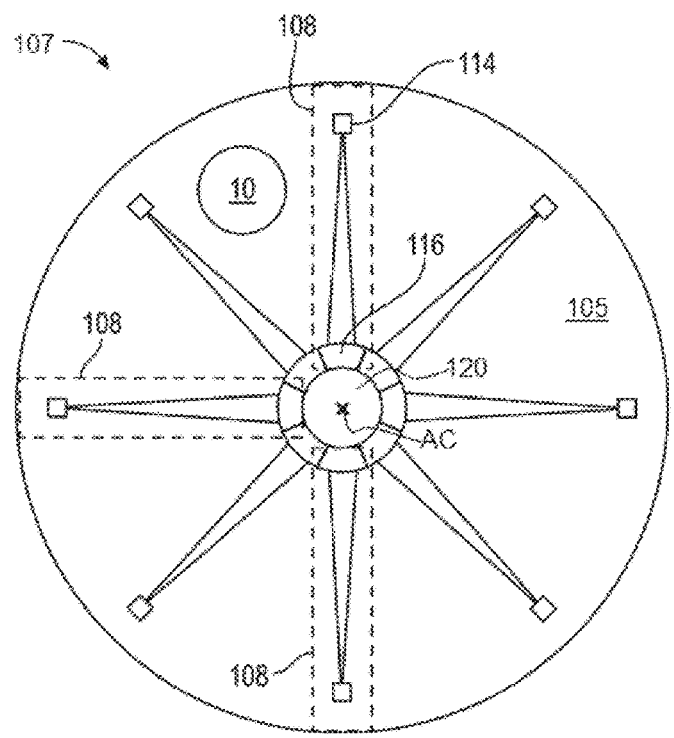

[Fig. 3]
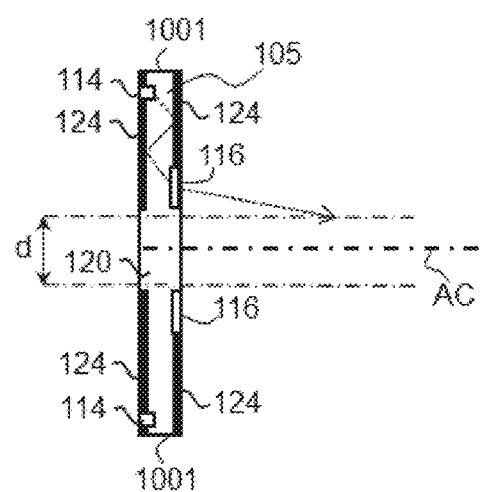
[Fig. 4]
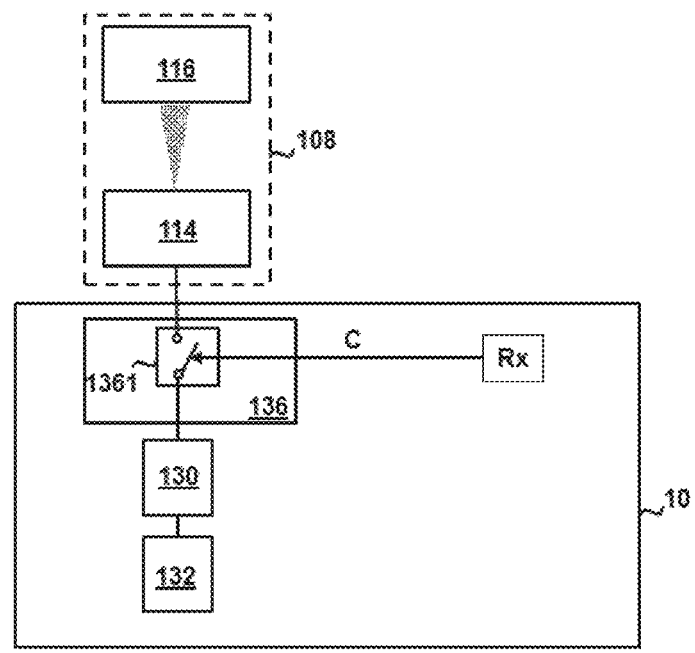
[Fig. 5]
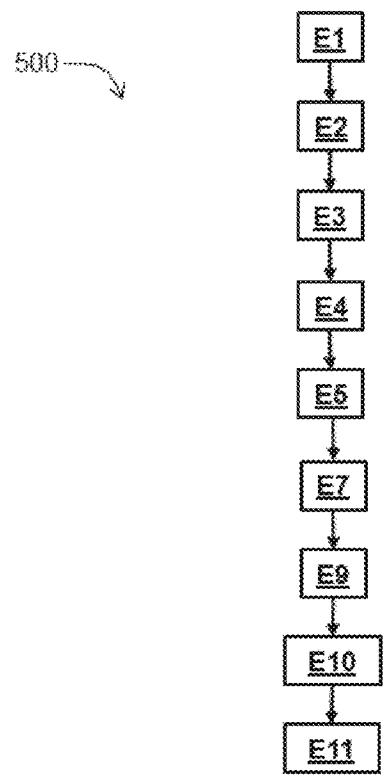
[Fig. 6]
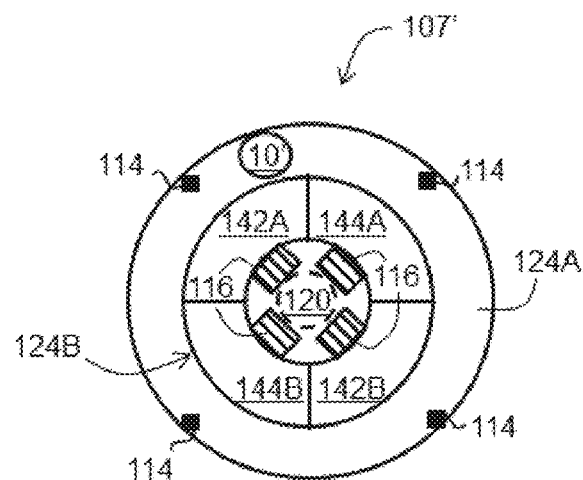

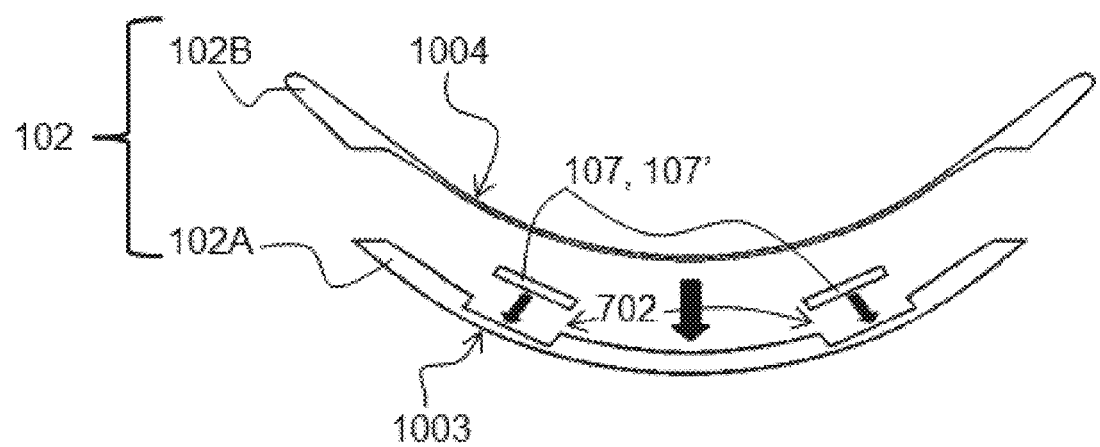
[Fig. 7]

CONTACT LENS FOR AUGMENTED REALITY AND METHOD THEREOF

The present invention relates to a contact lens for augmented reality and a method thereof.

By augmented reality, we understand the fact of superimposing an image representing text, a symbol, or a drawing, etc., to a real scene captured by the eye. The augmented reality is the basic principle of the Extended Reality (XR) and Mixed/Merged Reality (MR).

As an example of an augmented reality device, the US patent published as U.S. Pat. No. 8,786,675 B2 describes an augmented reality contact lens comprising:
 a transparent body designed to be placed on an eye;
 an optical light source attached to the transparent body and designed to emit a light into the transparent body; and
 an optical element attached to the transparent body and designed to receive the light from the optical source and send it in the direction of the eye.

In this document, the optical light source consists of a matrix of pixels. In one particular embodiment, the contact lens comprises a mirror to reflect the light back towards the optical element which is a converging lens, so that the image of the pixel matrix is focused on the retina of the eye.

This assembly has the disadvantage of being relatively complex to implement. It is bulky and can present optical alignment problems with a risk of masking the vision of the user of his environment.

The patent application published as JP2005311823 describes a contact lens in which a matrix of pixels is generated by means of an optical guide comprising a plurality of optical lines and an optical source adapted to illuminate the optical lines. Each pixel of the matrix is activated by locally applying an electric field through electrodes in order to locally modify the refractive index of the optical line. The contact lens further comprises a hologram configured to converge the luminous rays emitted from the pixel matrix at the centre of the pupil of the eye so as to achieve Maxwellian illumination.

Again, this assembling has the disadvantage of being relatively complex to implement. It is bulky and can present optical alignment problems with a risk of masking the vision of the user of his environment.

It may thus be desirable to provide a contact lens for augmented reality that allows to get rid of at least part of the above-mentioned problems and constraints.

Therefore, a contact lens for augmented reality is proposed, comprising:
 a transparent body designed to be placed on an eye;
 an optical light source attached to the transparent body and designed to emit a light into the transparent body; and
 an optical element attached to the transparent body and designed to receive the light from the optical source and send it in the direction of the eye;
 characterised in that the optical element is a hologram designed to diffract the received light as a holographic image in the direction of the eye.

Thus, the optical source can be very simple and compact because it does not have to create an image unlike a pixel matrix but simply emit the light. Indeed, according to the invention the image is created by the hologram. In particular, such an optical source can be significantly more compact than a pixel matrix.

Optionally, an augmented reality contact lens according to the invention may further comprise any or all of the following characteristics taken alone or in combination:
 the optical source is monochromatic and/or point-like;
 the contact lens further comprises an optical guide designed to guide the light from the optical source to the hologram;
 the optical guide comprises a transparent substrate and a layer of reflective material covering an outer surface of the transparent substrate;
 at least one of the optical sources and the hologram is arranged within the transparent substrate so as to be partially or completely surrounded by the transparent substrate;
 the contact lens comprises: a radio receiver attached to the transparent body and designed to receive a command; and a module for selectively activating the augmented reality module according to the received command;
 the selective activation module comprises an index modification device designed to modify a refractive index of the optical guide in order to modify the illumination of the hologram so that the latter ceases to provide the holographic image;
 the selective activation module is designed to deactivate the optical source; and
 the contact lens has a central area consisting solely of the transparent body.

Also proposed is an augmented reality method comprising:
 placing a transparent body of a contact lens on an eye;
 emitting a light into the transparent body from an optical source attached to the transparent body; and
 receiving the light by an optical element attached to the transparent body and sending the light in the direction of the eye through the optical element;
 characterised in that the optical element is a hologram and that the light sent in the direction of the eye is light diffracted by the hologram in the form of a holographic image.

The invention will be better understood with the aid of the following description, given only by way of example and made with reference to the attached drawings in which:

FIG. 1 is a cross-sectional view of an augmented reality contact lens according to the invention, and of an eye on which it is placed;

FIG. 2 is a back view of the augmented reality contact lens of FIG. 1, i.e. when this contact lens is observed from the eye;

FIG. 3 is a similar view to FIG. 1, where the elements of the contact lens are more detailed;

FIG. 4 is a functional view of an electronic module for controlling the optical sources of the contact lens of the previous figures;

FIG. 5 is a flowchart describing an augmented reality method according to an embodiment of the invention;

FIG. 6 is a back view of an augmented reality contact lens according to an embodiment of the invention; and FIG. 7 is a cross-sectional view of the contact lens of FIGS. 1 to 3 or of FIG. 6, when an augmented reality device is encapsulated in a transparent body of the contact lens.

With reference to FIG. 1, an augmented reality contact lens 100 according to the invention will now be described.

The contact lens 100 is designed to be applied to an eye 104 having an optical axis AO and a visual axis AV intersecting at a point O. As is known per se, the eye 104 first comprises a cornea 106 in the form of a spherical cap at the interface with the ambient air. The eye 104 also comprises an iris 122 pierced in its centre by a circular opening referred to as pupil 123 through which the light is transmitted. The iris 122 dilates or contracts according to the luminous intensity. The eye 104 further comprises a crystalline 118 formed by a transparent and flexible fibrous disc to focus the incident light received through the pupa 123. The point of intersection O is usually located about the centre of the crystalline 118. Behind the crystalline 118, on the other side of an ocular cavity 109, the eye 104 further comprises a retina 110 formed of sensory cells comprising cones for the day vision and sticks for the night vision. The retina 110 has a central area, referred to as fovea 111, in the extension of the visual axis AV, where the vision of details is the most precise. The fovea 111 is thus eccentric by a few degrees with respect to the optical axis AO. The retina 110 also has, around the fovea 111, an area, referred to as parafovea 112, corresponding to the peripheral vision. As can be seen in FIG. 1, the cornea 106, the pupil of the iris 122, and the crystalline 118 are substantially centred on the optical axis AO.

The contact lens 100 first comprises a transparent body 102 designed to be placed on the eye 104.

The transparent body 102 has a disc shape that domed around a central axis AC with a concave rear face 1004 and a convex front face 1003. The rear face 1004 has a shape complementary to the cornea 106 so as to be pressed against the cornea 106, in a preferred position of the contact lens 100 shown in FIG. 1. In this preferred position, the contact lens 100 is centred on the optical axis AO, so that the central axis AC of the transparent body 102 is substantially coincident with the optical axis AO.

As the transparent body 102 comes into contact with the cornea 106, it is made of biocompatible material such as with a base of silicone hydrogel or HEMA (Hydroxy Ethyl Methacrylate) or any other suitable material as described by C. Stephen, A. Musgrave and F. Fang in the article entitled *"Contact Lens Materials: A Materials Science Perspective"* published in the journal *Materials, Vol.* 14, 261, January 2019.

The contact lens 100 further comprises an augmented reality device 107 encapsulated within the transparent body 102 of the contact lens 100.

With reference to FIG. 2, the augmented reality device 107 will now be described in more detail.

The augmented reality device 107 has, for example, a general shape of a flat crown or alternatively a flat annulus having a centre located on the central axis AC of the transparent body 102. The augmented reality device 107 comprises a transparent substrate 105 intended to guide the light as will be explained later. The transparent substrate 105 comprises, for example, a liquid crystal.

The augmented reality device 107 further comprises at least one augmented reality module 108. In the example shown in FIG. 2, the augmented reality modules 108 are eight in number and distributed in a star pattern, such that each augmented reality module 108 is aligned along one branch of the star.

The augmented reality device 107 further comprises a control module 10 of the augmented reality modules 108, attached to the transparent substrate 105. This control module 10 will be described in more detail later, with reference to FIG. 5.

Each augmented reality module 108 is designed, once the contact lens 100 is in its preferred position on the eye 104, to generate an image on the retina 110, superimposed on a real scene captured by the eye 104. In the example described, the image is a warning sign intended to appear in peripheral vision. Thus, in the example described, the image is preferably generated on the parafovea 112. Further, again in the example described, each augmented reality module 108 is designed to provide a different image on the retina 110. Thus, in this example, up to eight different images can be displayed on the parafovea 112.

The augmented reality modules 108 are similar to each other so that only one of them will now be described in more detail.

The augmented reality module 108 first comprises an optical source 114 attached to the transparent substrate 105 and designed to emit a light into the transparent substrate 105.

Preferably, the optical source 114 is point-like, i.e., it has a light output of less than 100 µm, and monochromatic, i.e., for example, the light it emits has a single wavelength emission peak, having at half-height width of at most 100 nm. This peak is located in the visible light, approximately 400-750 nm, and preferably in the green or the red: 500-670 nm. Alternatively, the peak is in the wavelengths of sensitivity of the photoreceptors of the retina 110, and more specifically of the parafovea 112 (e.g., 420 nm for the sticks and 534 nm for the cones M).

Even more preferably, the optical source 114 has a divergence of less than 40°.

For example, the optical source 114 comprises a laser and more particularly at least one vertical-cavity surface-emitting laser diode referred to as VCSEL. Indeed, advantageously, this type of optical source has a reduced size, thus allowing the thickness of the contact lens 100 to be substantially reduced, compared to the pixel matrices used in the contact lenses of the prior art.

The augmented reality module 108 further comprises a hologram 116 attached to the transparent substrate 105 and designed to receive the light from the optical source 114 and send it in the direction of the eye 104, and more specifically toward the crystalline 118 through the pupil 123. The hologram 116 is a diffractive optical element generally designated by the acronym DOE (Diffractive Optical Element). Thus, the hologram 116 is designed to diffract the received light as a holographic image in the direction of the eye 104. This transformation is based on the phenomenon of optical diffraction, so that the diffracted light (the holographic image) corresponds, for example, to the Fresnel or spatial Fourier transform of the final image to be imaged on the retina 110. Preferably, the fabrics through which the light passes are taken into account in the design of the hologram.

Thus, in general, the hologram 116 is configured to create and project the desired final image onto the retina of the eye. In particular, the structure of the hologram defines this image. As noted above, in some embodiments, the hologram may be configured so as to provide the spatial inverse Fourier transform of the final image to be projected onto the retina. In other embodiments, the hologram may be configured to implement an additional optical function such as the Fresnel transform of the desired image.

In practice, the hologram 116 comprises, for example, a blade of transparent substrate of constant thickness, such as a glass plate, on or in which are profiled microstructures or nanostructures configured to diffract the incident wavefront in order to generate the holographic image. These microstructures or nanostructures form a diffraction pattern. Alternatively, instead of operating in transparency, the hologram 116 could operate in reflection and be in the form of a reflective mirror.

For example, the hologram 116 is obtained by depositing a layer of photosensitive resin (for example of the S1813 type) with a thickness of approximately 1.2 µm, on the surface of the transparent body 102, in an area located facing one end of the pupil 123, when the contact lens 100 is in its preferred position on the eye 104. A phase profile of multi-level phase is then photo-inscribed into the resin, with the regions surrounding the hologram 116 fully exposed. In a development step, the hologram 116 is engraved into the resin layer, with the resin around the hologram 116 being removed. The resulting hologram 116 has, for example, a resolution of about 750 nm with an engraving depth of about 1000 nm.

In order not to interfere with the central vision of the eye 104, the contact lens 100 preferably has a central area 120 formed solely of the transparent body 102. This central area 120 is located on the optical axis AO, in front of the pupil 123, when the transparent body is placed on the eye 104 in its preferred position. Thanks to this central area 120, the pupil 123 is at least partly clear of any element that could degrade the vision.

In particular, in the example described, the holograms 116 of the various augmented reality modules 108 are arranged in an annulus around the central area 120. This hologram crown 116 has its largest radius equal to the mydriasis (maximum opening of the pupil, for example, 8 mm) and its smallest radius such that the central area of the pupil 123 is free (for example, 2 mm), meaning that the pupil 123 can vary between these two values. Thus, each hologram 116 has, in the example described, a radial dimension of at most 6 mm. In the case where the pupil 123 is equal to the minimum radius of the holographic crown, no projection can be made on the retina 110. Otherwise, an image will always be formed on the retina, even if the hologram 116 is only partially clear, because in this case the holographic image of at least one portion of the patterns of the hologram 116 still passes through the pupil 123, which is sufficient, by the mode of design of said hologram, to allow the appearance of a final image on the retina 110, in return, however, for a reduction of the level of illumination of the retina 110. Indeed, the hologram 116 comprises a periodic pattern so that if one portion of it is occulted by the pupil 123, the hologram 116 allows to create a holographic image which is still imaged on the retina 110 via the crystalline 118 but with a reduced intensity and possibly with a reduced resolution compared to the case where the hologram 116 is not partially occulted by the pupil 123.

With reference to FIG. 3, the central area 120 preferably has a diameter d around the central axis AC of at least 3 mm to properly clear the pupil 123.

To prevent one portion of the light emitted by the optical source 114 from exiting the transparent substrate 105 before reaching the hologram 116, the contact lens 100 further comprises a layer of reflective material 124 covering at least partly the surface of the transparent substrate 102, except for the central area 120 so as not to occult the central vision of the eye 104. Thus, the transparent substrate 105 and the layer of reflective material 124 form an optical guide guiding the light from the optical source 114 to the associated hologram 116.

Outside of the central area 120, the layer of reflective material 124 does not necessarily extend over the entire remaining surface of the transparent substrate 105. For example, a periphery 1001 of the transparent substrate 105 may be devoid of any reflective material layer 124.

For example, the reflective material layer 124 comprises gold. In this case, a very thin reflective layer of the order of a few nanometres can advantageously be produced by photo-lithographic technique, for example of the "lift-off" type.

Alternatively, the reflective material layer 124 comprises aluminium or silver, which advantageously allows to enhance the strength and the reflectivity factor of the reflective material layer 124.

As can be seen in FIG. 3, the optical source 114 and the hologram 116 are arranged within the transparent substrate 105, so as to be partially surrounded by and flush with the transparent substrate 105. Alternatively, one or both could be completely surrounded by the transparent substrate 105.

With reference to FIG. 4, an example of embodiment of the control module 10 will now be described in more detail.

The control module 10 first comprises an electrical feed source 130, such as a battery 130. In particular, the electrical feed source 130 is designed to feed the optical source 114 of each augmented reality module 108.

The control module 10 further comprises means for recharging the battery 132, for example of the inductive type.

The control module 10 further comprises a radio receiver Rx, for example Wi-Fi, designed to receive commands C.

The contact lens 100 further comprises a module 136 for selectively activating the augmented reality module 108 based on the received command C. For example, the selective activation module 136 comprises a switch 1361 connected between the battery 130 and the optical source 114.

With reference to FIG. 5, an example of an augmented reality method 500 will now be described.

Specifically, this method describes the use of one of the augmented reality modules 108, but can be applied to each of the augmented reality modules 108.

During, a step E1, the contact lens 100 is placed on the eye 104 so that the transparent body 102, and more precisely its rear face 1004, is placed on the cornea 106, in the preferred position as shown in FIGS. 1 and 3.

It is assumed that initially, the augmented reality module 108 is not activated, so it does not provide a holographic image.

During a step E2, the selective activation module 136 receives, via the receiver Rx, a command C indicating the activation of the augmented reality module 108.

During a step E3, in response to the command C, the selective activation module 136 activates the augmented reality module 108 indicated in the command C to provide a holographic image. In the example described the switch 1361, which was initially in the open position, is closed so that the electrical feed source 130 feed the optical source 114.

During a step E4, the now fed optical source 114 emits light that is guided into the interior of the transparent body 102 by optical reflection between the layers of reflective material 124.

During a step E5, the hologram 116 associated with this optical source 114 receives the guided light.

During a step E7, the hologram 116 diffracts the received light to form a holographic image sent in the direction of the eye 104, and more precisely in the direction of the pupil 123.

In FIG. 3, a luminous ray has been represented as a dotted line, in order to materialize the path of the light in a simplified way. In fact, a plurality of luminous rays are emitted by the optical source 114, so as to form a luminous beam.

During a step E9, the crystalline 118 receives the wave diffracted by the hologram and participates in the reconstruction of a final image (corresponding to this holographic image) on the retina 110.

Thus, the final image of the virtual object appears on the retina 110 where it is superimposed on the real scene captured by the eye 104. In the example described, the optical reconstruction takes place in the parafovea 112 so that the final image appears in the peripheral vision of the eye 104.

Specifically, the image of the virtual object is projected at about 10° from the fovea 111 (or equivalently, from the optical axis AO) relative to the point O to avoid disturbing the central vision, which corresponds to 12-15° from the optical axis AO relative to the point O. Preferably, the final image extends over at most 2° of field of view (about four full moons), which corresponds to a length of about 1.15 mm on the retina 110. At such a distance from fovea 111, the neural resolution is significantly reduced compared to the fovea 111, so that the smallest details in the final image would have to be at least 48 micrometres to be perceived.

During a step E10, the selective activation module 136 receives, via the receiver Rx, a command C indicating the deactivation of the augmented reality module 108.

During a step E11, in response to the command C, the selective activation module 136 deactivates the augmented reality module 108 indicated in the command C so that the latter no longer provides a holographic image. In the example described, the switch 1361 is opened so that the electrical feed source 130 no longer feed the optical source 114 and the latter stops emitting the light.

With reference to FIG. 6, a contact lens 100' according to an alternative embodiment of the invention will now be described.

This variant of embodiment differs essentially from the previous embodiment described above on the number of augmented reality modules (four instead of eight) and on the way in which the holograms intended to be sent in the direction of the eye are selectively activated and deactivated.

According to this embodiment, the optical sources 114 emit the light continuously and the selective activation module 136 comprises, for each hologram 116, an index modification device 140 designed to modify a refractive index of the transparent substrate 105, by means of, for example, the liquid crystal it contains. Indeed, this liquid crystal is a birefringent electro-optical component whose index is modified by the application of an electric field. Once the index is changed, the guiding conditions (e.g., the deflection angle) are changed so that the hologram 116 is no longer illuminated so as to provide the holographic image.

For example, the index modification device 140 comprises at least one pair of electrodes designed to generate the electric field changing the refractive index, at least in one direction. In the example described, these electrodes are made by plates of reflective material 124. Specifically, the reflective material 124 comprises, on a front face of the transparent substrate 105, a large annulus 124A and, on a rear face of the transparent substrate 105, a small annulus 124B. This small annulus 124B is divided into four segments 142A, 142B, 144A, 144B electrically isolated from each other and connected to the control device 10'. Each pair of opposite segments forms a pair of electrodes.

Thus, upon the reception of a command C, the selective activation module 136 is designed to apply a voltage between the electrodes associated with the augmented reality module 108 concerned by the command C, in order to change the refractive index of the transparent substrate 105 extending between the electrodes. Thus, the hologram 116 of the augmented reality module 108 is no longer adequately illuminated to provide the holographic image.

With reference to FIG. 7, the transparent body 102 comprises, for example, a base 102A having a housing 702 for receiving the augmented reality device 107 or 107', and a cover 102B designed to cover the base and the augmented reality device 107 or 107' received in the housing 702.

According to the preceding description, one understands well that it is the hologram which creates the holographic image, when it is illuminated by the optical source. In this case, the optical source provides a neutral light that does not comprise any image or image information (for example, a beam of light of uniform intensity). Thus, the hologram illuminated only by the optical source is able to create an image in the direction of the eye. In contrast to the prior art techniques, no screen or pixel matrix is required. In particular, the optical source can be as simple as a point-like source illuminating the hologram alone.

It is clear that a contact lens for augmented reality such as those described above allows to superimpose on the retina of the eye an image to a real scene captured by the eye, in a compact and simple way.

It will be further noted that the invention is not limited to the embodiments described above. It will indeed appear to the person skilled in the art that various modifications can be made to the above-described embodiments, in the light of the teaching just disclosed.

In particular, the nature and the emission properties of the optical source can be adapted according to the aimed application.

In addition, an optical element, such as a Fresnel lens, could be placed between the optical source 114 and the hologram 116 in order to shape the beam to improve the imaging conditions.

In the foregoing detailed presentation of the invention, the terms used should not be interpreted as limiting the invention to the embodiments exposed in the present description, but should be interpreted to include all equivalents the anticipation of which is within the reach of the person skilled in the art by applying his general knowledge to the implementation of the teaching just disclosed.

The invention claimed is:

1. A contact lens for augmented reality comprising:
   a transparent body designed to be placed on an eye;
   at least one augmented reality module comprising:
     an optical source attached to the transparent body and designed to emit a light into the transparent body;
     an optical element attached to the transparent body and designed to receive the light from the optical source and send it in the direction of the eye;
   characterised in that the optical source is adapted to emit light, received by the optical element, comprising no image and in that the optical element is a hologram designed to diffract the received light so as to create a holographic image in the direction of the eye;
   the contact lens further having a central area consisting solely of the transparent body.

2. The lens of claim 1, comprising a plurality of augmented reality modules, each module being designed to provide a different final image on the retina.

3. The contact lens of claim 1, wherein the optical source is monochromatic and/or point-like.

4. The contact lens according to claim 1, further comprising an optical guide designed to guide the light from the optical source to the hologram.

5. The contact lens of claim 4, wherein the optical guide comprises a transparent substrate and a layer of reflective material covering an outer surface of the transparent substrate.

6. The contact lens of claim 5, wherein at least one of the optical sources and the hologram is arranged within the transparent substrate so as to be partially or completely surrounded by the transparent substrate.

7. The contact lens according to claim 1, comprising:
a radio receiver attached to the transparent body and designed to receive a command; and
a module for selectively activating each augmented reality module according to the received command.

8. The contact lens according to claim 4, wherein the selective activation module comprises an index modification device designed to modify a refractive index of the optical guide to modify the illumination of the hologram so that the latter ceases to provide the holographic image.

9. The contact lens of claim 8, wherein the selective activation module is designed to deactivate the optical source.

10. An augmented reality method, comprising:
placing a transparent body of a contact lens on an eye;
emitting a light into the transparent body from an optical source attached to the transparent body; and
receiving the light by an optical element attached to the transparent body and sending the light in the direction of the eye through the optical element;
characterised in that the light emitted by the optical source and received by the optical element comprise no image and in that the optical element is a hologram that diffracts the received light in order to create a holographic image in the direction of the eye;
the contact lens further having a central area consisting solely of the transparent body.

* * * * *